United States Patent Office 3,334,476
Patented Aug. 8, 1967

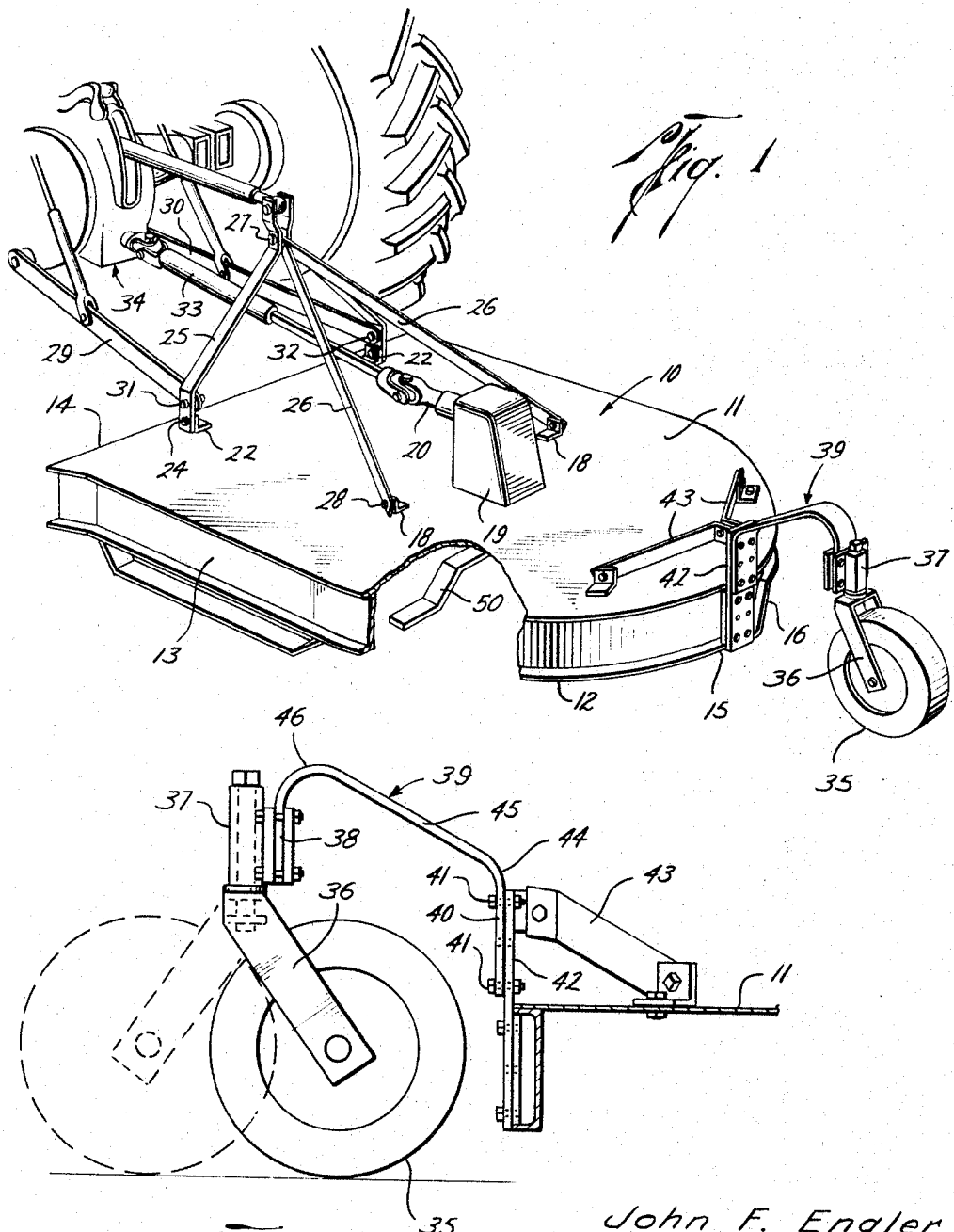

3,334,476
RESILIENT SUPPORT FOR A ROTARY MOWER HOUSING
John F. Engler, P.O. Box 7616,
Houston, Tex. 77007
Filed Sept. 21, 1964, Ser. No. 397,680
4 Claims. (Cl. 56—322)

ABSTRACT OF THE DISCLOSURE

A rotary mower supported at its front end and drawn and driven by a tractor and supported at its rear end by a swivelled tail wheel mounted on a curved leaf spring.

Background of the invention

This invention relates to rotary mowers, and more particularly it relates to rotary mowers to be drawn behind a tractor and having a swivelled tail wheel to support the rear end of the mower.

One form of mower commonly used for mowing fields, highway right of way, and the like, is a rotary mower of the type having a blade rotating in a horizontal plane beneath a housing. The housing is attached to the rear of the frame of a tractor in such a way that the front end of the housing is supported by the tractor and the mower can be drawn by the tractor. The rear end of the mower is usually supported by a swivelled tail wheel. It is necessary for the tail wheel to be swivelled, because the mower housing is normally rigidly attached to the rear of the tractor, so that it cannot pivot in a horizontal plane with respect to the tractor, so that when the tractor turns, the rear of the mower is swung laterally. The pivotable tail wheel provides rolling support for the rear of the mower during such turning and consequent lateral movement.

The pivotable tail wheel supporting the rear end of the mower extends rearwardly from the rear end of the housing in order to be clear of the rotating blade. This has resulted in a major problem in the use of these mowers. When the mower is used in a field where there are trees, or other places where similar unyielding objects are encountered, the turning of the mower swings the tail wheel into such objects with great force, causing the wheel to be damaged and often to be broken off the mower.

Summary of the invention

According to the present invention means are provided for preventing or greatly decreasing the damage incurred by such a mower tail wheel. Such means comprises a resilient connection between the mower housing and the tail wheel. In a preferred embodiment of the invention, the resilient connection is of such a form as to provide resilience in three planes, so that the wheel will yield to shock loads from any direction, and particularly will yield when it strikes an unyielding object upon rapid lateral movement of the rear end of the mower housing.

Brief description of the drawing

For a better understanding of the invention, reference is made to the following description and to the accompanying drawing, wherein FIGURE 1 is a perspective view of a mower having a tail wheel mounting in accordance with this invention, and FIGURE 2 is a partial elevational view thereof.

Description of the preferred embodiment

In the drawing, wherein for the purpose of illustration is shown a preferred embodiment of the invention, the numeral 10 designates generally a housing for the rotary mower including a top wall 11, circularly rounded at its rear end 12. The housing 10 further comprises depending parallel vertical side wall portions 13, which extend from the forward transverse end 14 of the housing top wall to approximately the rear center 15 of the housing. The housing 10 is entirely open at its bottom and its forward end, and also has an opening 16 on one side of the curved rear end so as to provide an outlet for material cut by the mower.

A pair of spaced upstanding bracket plates 18 are rigidly secured to the housing top wall 11, and mounted on the top wall between these bracket plates is a conventional right angle bevel gear drive 19, having a forwardly extending horizontal input shaft 20, and a depending vertical drive or output shaft (not shown) to operate the mower cutter blade 50.

Brackets 22 are rigidly secured to the top of housing 10, as shown, and are connected at 24 with a standard three point hitch yoke 25, vertically disposed adjacent the forward end of the housing 10, as shown. Lift links 26 interconnect the top of the yoke 25 with the brackets 18, as indicated at 27 and 28. The usual power-operated tractor lift arms 29 and 30 are connected at 31 and 32 with the upstanding yoke 25 as shown, and this connection is largely conventional and may be varied as found desirable.

The input shaft 20 of the right angle gear drive 19 receives power from the usual power take-off shaft 33 of the tractor 34.

By the above-described means, the mower housing 10 is bodily carried by the tractor 34 and adapted to be raised and lowered relative to the ground, as should be obvious.

According to this invention a trailing wheel or tail wheel 35 is provided to support the rear end of the mower. The tail wheel is rotatably mounted in a yoke 36 which is mounted to swivel about a vertical axis by means of a rotatable shaft affixed to the upper end of the yoke and mounted for rotation in a housing 37. Housing 37 is rigidly affixed to a vertical portion 38 of a resilient mounting arm 39. The arm 39 is rigidly attached to the rear of the mower housing by means of another vertical portion 40. As shown, vertical portion 40 is affixed, as by means of bolts 41, to a standard 42 affixed to the rear of the mower housing, and extending upwardly therefrom. A pair of braces 43 provide support for the free upper end of the standard 42.

The mounting arm 39 is made of flat spring steel bar. As shown, the vertical portion 40 blends, through a curved portion 44, into an upwardly and rearwardly extending resilient portion 45. This portion 45 in turn blends, through a curved portion 46, with the vertical portion 38 of the mounting arm. It is apparent that the mounting arm is formed by bending it in a single plane, perpendicular to the flat of the bar, so that the flat sides of the two vertical portions face each other. These vertical portions, being fastened to other elements, are relatively rigid, whereas the curved and upwardly and rearwardly extending portions are relatively resilient.

The unique shape and arrangement of the mounting arm for the tail wheel of the mower of this invention not only provide vertical resiliency so as to absorb shocks caused by normal running over rough ground, but also provide resiliency from shocks in any other direction. When the mower is swung laterally, due to the turning of the tractor, so that the tail wheel strikes a tree, for example, the resilient arm can twist to absorb the shock, rather than being broken from the shock.

Although a preferred embodiment of the invention has been shown and described herein, the invention is not limited to this embodiment, but only as set forth by the following claims.

I claim:
1. A mower comprising
   a housing, cutter means supported beneath said housing,
rigid support means at the forward end of said housing for attachment of the mower to a tractor for supporting the front end of the housing and pulling the mower, and
support means for the rear end of the housing comprising
    a resilient mounting arm having a first rigid substantially vertical portion attached to the rear of the housing,
    an upwardly and rearwardly extending resilient portion having a curved end merging with the upper end of the said rigid portion,
    a second rigid substantially vertical portion substantially parallel to and rearwardly of the first rigid portion,
    another curved end on the resilient portion merging with the second rigid portion,
    a swivelled yoke mounted on said second rigid portion, and
    a tail wheel rotatably mounted in said yoke.

2. A mower as defined by claim 1 wherein said resilient mounting arm is made of a flat steel bar, and the rigid and resilient portions are formed by bending in a single plane with the flat sides of the rigid portions facing each other.

3. A mower comprising
a housing,
cutter means supported beneath said housing,
means at the forward end of the housing for attaching the mower to a tractor in such a way as to preclude horizontal pivoting of said housing with respect to the tractor,
a swivelled tail wheel mounted at the rear end of the housing, and
a resilient mounting arm mounting said tail wheel, said mounting arm comprising a flat bar bent in a single plane to form two substantially parallel, substantially vertical portions with the flat sides facing each other and an intermediate upwardly and rearwardly extending portion joined to the vertical portions by curved portions,
one of said vertical portions being attached to the rear of the mower housing and the other vertical portion being attached to the tail wheel.

4. A mower comprising
a housing,
cutter means supported beneath said housing,
support and draft means at the forward end of said housing for attachment to a tractor for supporting the front end of the housing and pulling the mower, said support and draft means including means for lifting and lowering said housing,
a swivelled tail wheel positioned rearwardly of said housing,
a resilient member resiliently connecting said tail wheel and said housing, and
a pair of rearwardly converging members on said housing connected to one end of said resilient member,
whereby said tail wheel provides a resilient support for the rear end of the mower and maintains said cutter means above ground level when the housing is in lowered position.

References Cited

UNITED STATES PATENTS 2,761,692   9/1956   Sisulak.
3,015,927   1/1962   Caldwell _____ 56—25.4

ABRAHAM G. STONE, *Primary Examiner.*

ANTONIO F. GUIDA, *Examiner.*